US012628800B2

(12) United States Patent
Cote

(10) Patent No.: US 12,628,800 B2
(45) Date of Patent: May 19, 2026

(54) BIRD FEEDER HAVING REINFORCING RING

(71) Applicant: Paul L. Cote, Knowlton (CA)

(72) Inventor: Paul L. Cote, Knowlton (CA)

( * ) Notice: Subject to any disclaimer, the term of this patent is extended or adjusted under 35 U.S.C. 154(b) by 0 days.

(21) Appl. No.: 19/048,396

(22) Filed: Feb. 7, 2025

(65) Prior Publication Data

US 2025/0255279 A1      Aug. 14, 2025

Related U.S. Application Data

(60) Provisional application No. 63/552,400, filed on Feb. 12, 2024.

(51) Int. Cl.
*A01K 39/012*          (2006.01)
(52) U.S. Cl.
CPC ................................... *A01K 39/012* (2013.01)
(58) Field of Classification Search
CPC .................................................... A01K 39/012
See application file for complete search history.

(56) References Cited

U.S. PATENT DOCUMENTS

| | | | | |
|---|---|---|---|---|
| 1,467,329 A | * | 9/1923 | Kesterson | A01K 39/012 119/53 |
| 4,896,628 A | * | 1/1990 | Kadunce | A01K 39/012 119/52.2 |
| 2007/0169705 A1 | * | 7/2007 | Cote | A01K 39/0113 119/52.3 |
| 2007/0227453 A1 | * | 10/2007 | Puckett | A01K 39/012 119/57.8 |
| 2014/0360435 A1 | * | 12/2014 | Cote | A01K 39/0106 119/57.8 |

* cited by examiner

*Primary Examiner* — Jessica B Wong
(74) *Attorney, Agent, or Firm* — Andrews Robichaud PC; Alessandro Colonnier

(57) ABSTRACT

The present disclosure provides a bird feeder having a seed container, seed tray, shroud, cover as well as a reinforced lower ring. The lower ring helps reinforce the lower part of the seed container. The bird feeder is also comprised of gaps positioned in between the cover and the seed container to increase a flow of air out of the seed container.

12 Claims, 9 Drawing Sheets

BIRD FEEDER HAVING REINFORCING RING

CROSS REFERENCE TO RELATED APPLICATION

The present application claims priority to U.S. Provisional Application No. 63/552,400, entitled "BIRD FEEDER HAVING REINFORCING RING" filed on Feb. 12, 2024, the contents of which are incorporated herein by reference in their entirety.

FIELD

The disclosure relates generally to the field of bird feeders, and more specifically to a bird feeder having a reinforced snap-fit ring and improved air circulation.

BACKGROUND

Bird feeders have been around for quite some time for bird watchers and animal lovers. However, many problems exist with current bird feeders, including but not limited to poor air circulation and fragile seed containers. Indeed, the existing seed containers are not well adapted to provide good air flow, and the lower end of those same seed containers can break easily when they are connected and disconnected from the bases for cleaning.

As such, there is a need for a novel type of bird feeder that can overcome the problems of the prior art.

SUMMARY

In an aspect, the present disclosure provides a bird feeder comprising: a seed container to contain seeds, the seed container having at least one opening to provide access to the seeds; a seed tray connected to the seed container and adapted to receive the seeds; perches to facilitate access to the at least one opening; a base releasably secured to the seed container; and, a cover.

In another aspect, the present disclosure provides a bird feeder comprising: a seed container to contain seeds, the seed container further comprising: at least one opening to provide access to the seeds; a base; and, an upper end terminating in an upper ring; a seed tray connected to the seed container and adapted to receive the seeds; perches to facilitate access to the at least one opening; and, a cover having a plurality of fins to cooperate with the upper end of the seed container.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
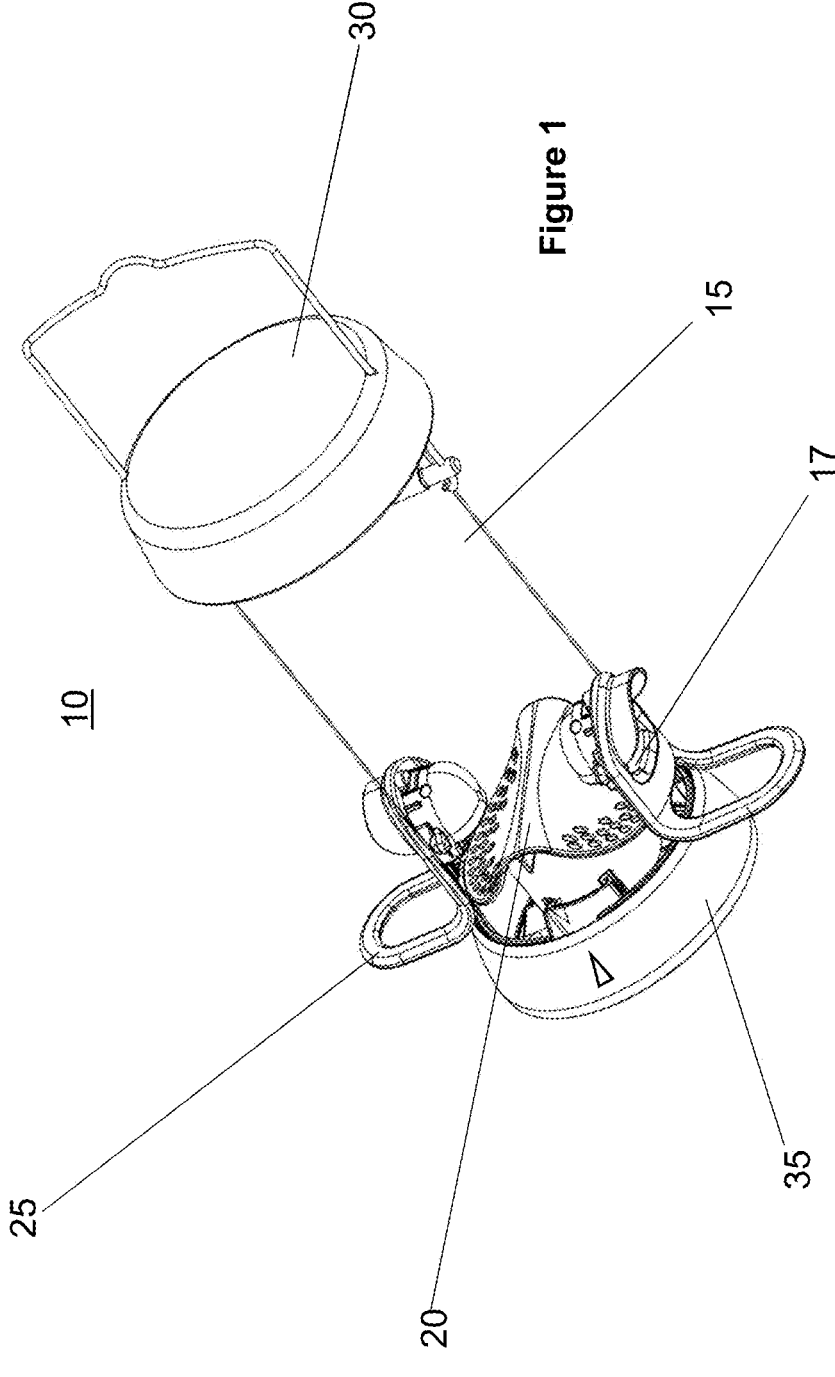
FIG. 1 is a perspective view of a bird feeder, according to an embodiment of the present disclosure.

With reference to FIG. 1 and according to an embodiment of the present disclosure, a bird feeder 10 is shown, preferably comprising a seed container 15 to contain seeds, the seed container 15 having at least one opening 17 to provide access to the seeds. The feeder 10 is also comprised of a seed tray 20 connected to the seed container 15 and adapted to receive the seeds, as well as perches 25 to facilitate access to the opening 17. A cover 30 and a base 35 are also provided, the base 35 releasably secured to the seed container 15. In another embodiment, the seed container 15 and cover 30 are one piece.

Figure 2A:
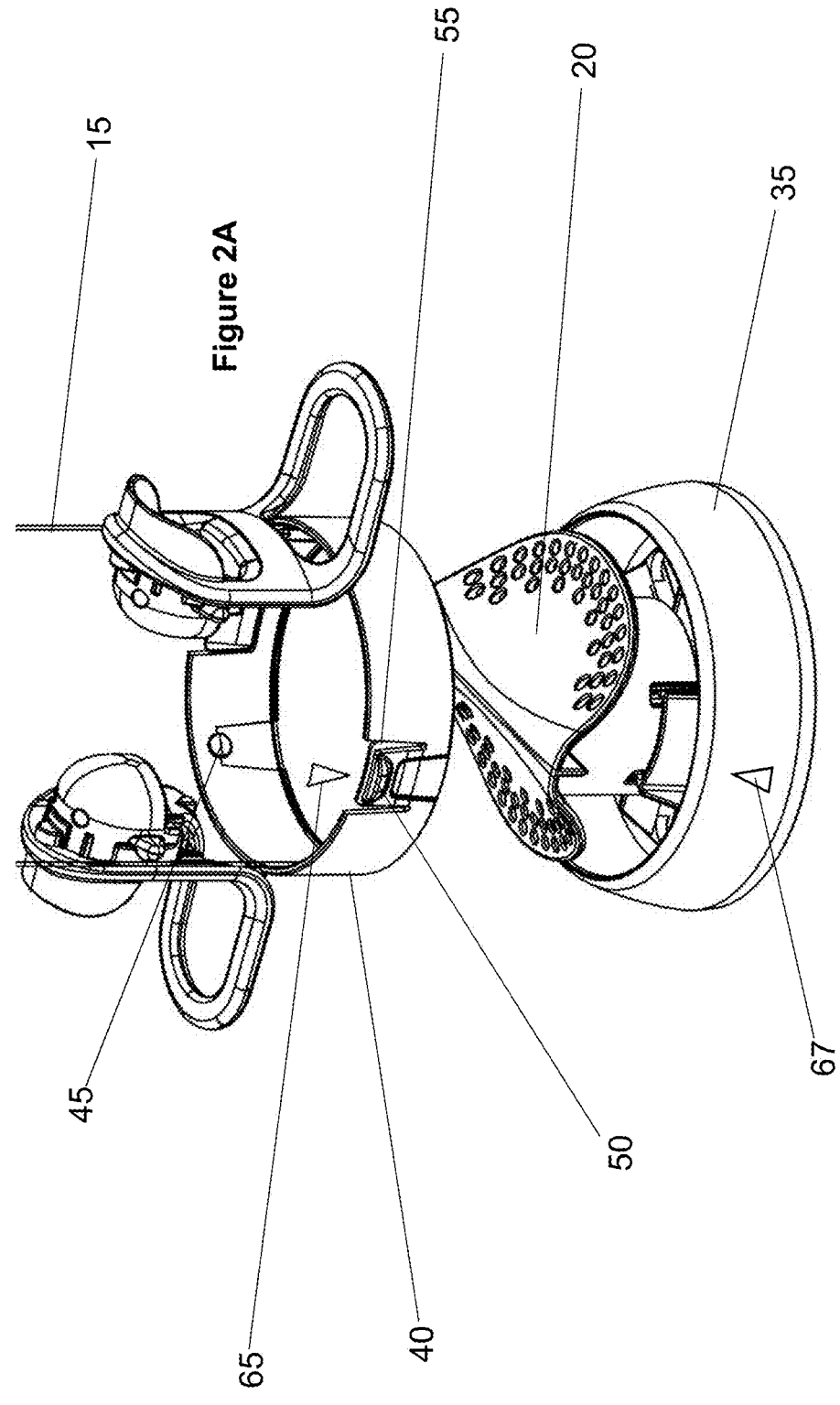
FIG. 2A is a first enlarged exploded view of a lower end of the bird feeder of FIG. 1, according to an embodiment of the present disclosure.
Figure 2B:
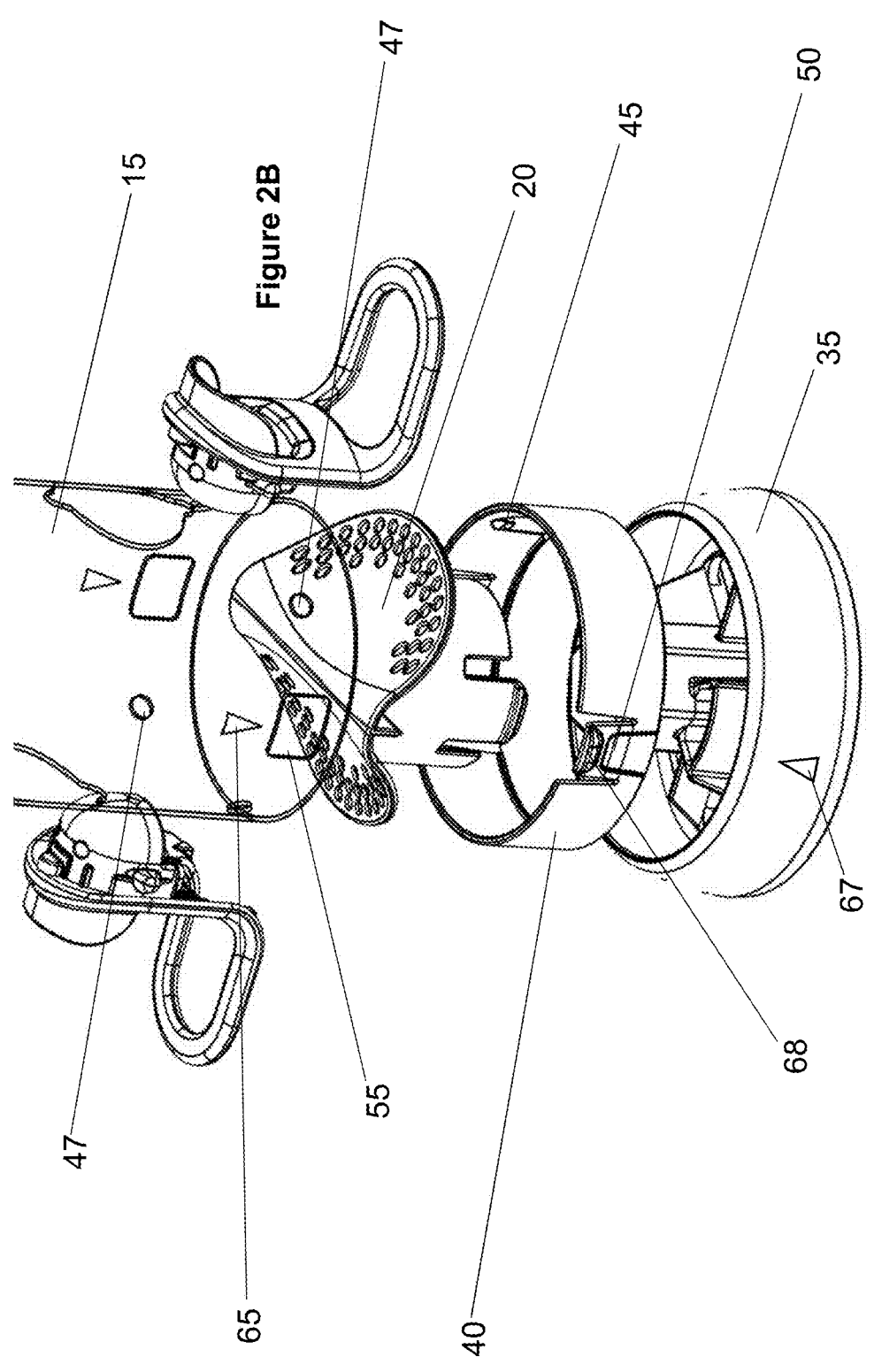
FIG. 2B is a second enlarged exploded view of a lower end of the bird feeder of FIG. 1, according to an embodiment of the present disclosure.
Figure 3A:
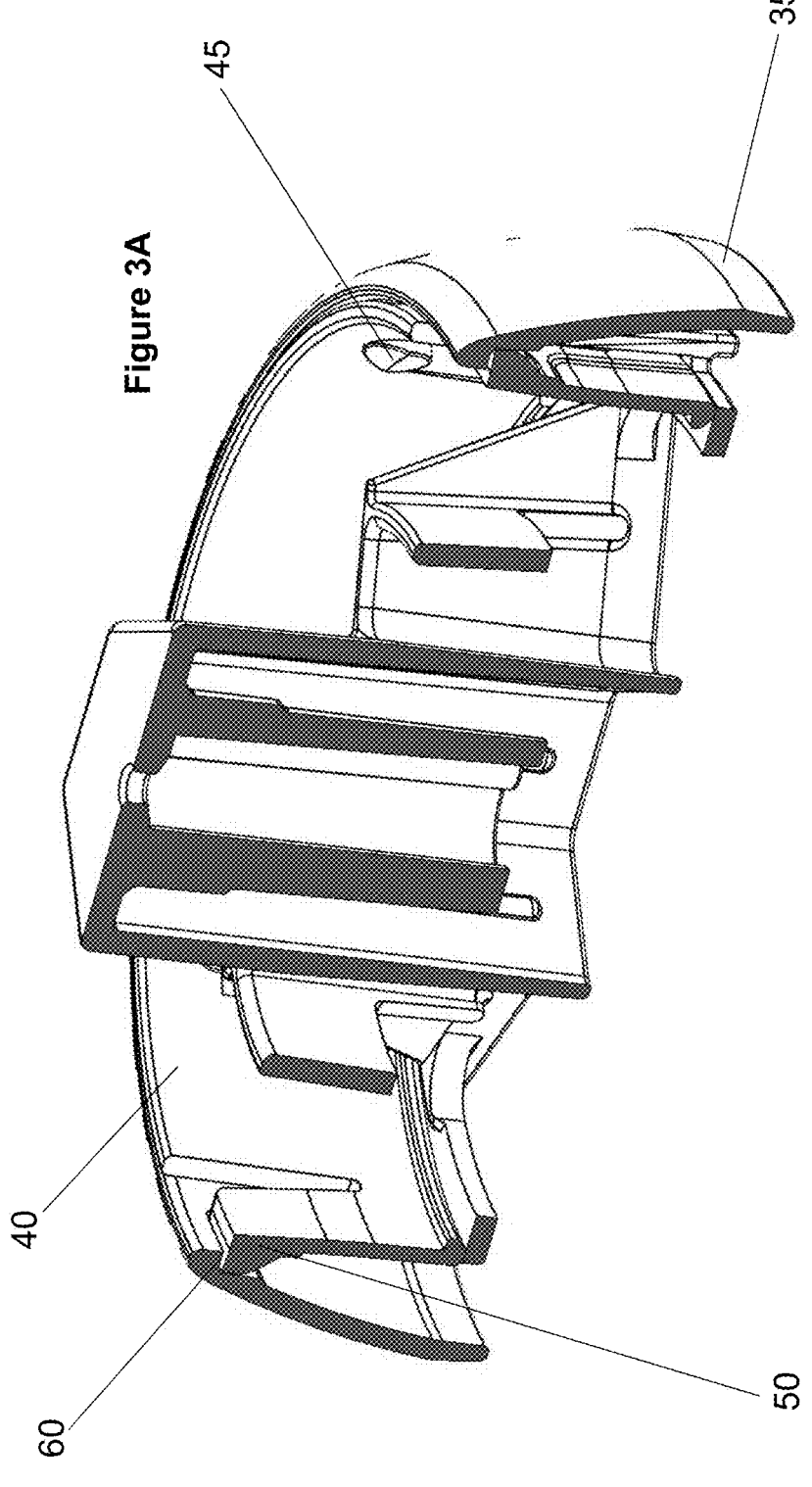
FIG. 3 is an enlarged cross-sectional view of the base and lower ring of the bird feeder of FIG. 1, according to an embodiment of the present disclosure.
Figure 3B:
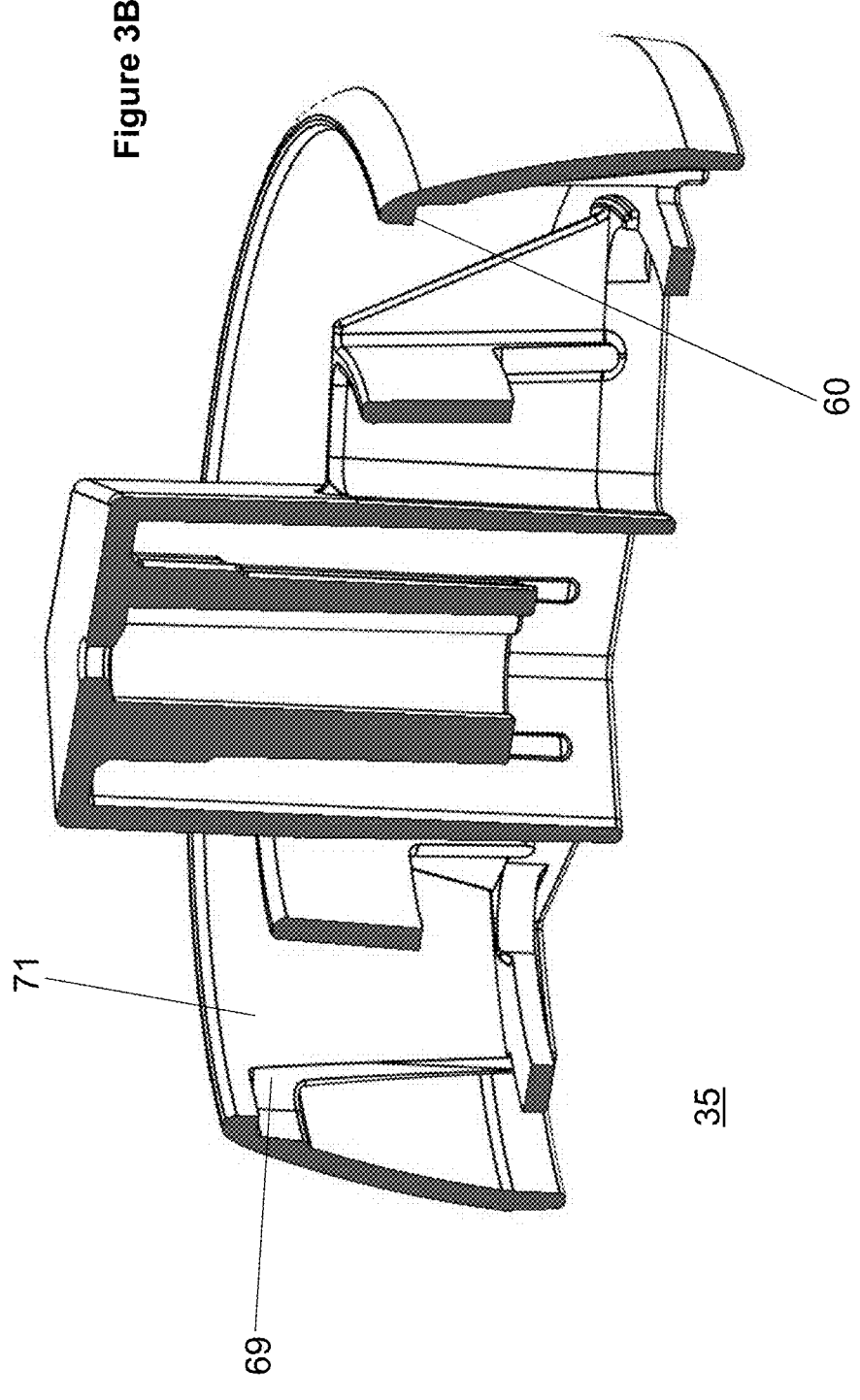

With reference to FIGS. 2A, 2B, 3A and 3B and according to an embodiment of the present disclosure, the interconnection between the seed container 15 and base 35 is shown. More specifically, the seed container 15 is further comprised of a lower ring 40 that surrounds a lower end of the seed container 15 to reinforce said lower end. Indeed, it was determined that without the lower ring 40, the lower portion of the seed container 15 would be more prone to breaking and would have difficulties connecting and disconnecting from the base. As such, the lower ring 40 assists by reinforcing the lower end of the seed container 15 and making it easier to manipulate it. In a preferred embodiment, the lower ring 40 is attached to the seed container 15 by pins 45 fitted through openings 47, although other attachment means are possible. The lower ring 40 is comprised of pivotable or flexible tabs 50 to releasably secure the lower ring 40, and thus the container 15, to the base 35. As shown, the seed container 15 is comprised of apertures 55 adapted to receive the tabs 50 when they are pivoted or flexed. More specifically, when the container 15 is secured to the lower ring 40 as shown in FIG. 2A, the tabs 50 are aligned with the apertures 55. The apertures 55 are preferable as the tabs 50 are pivotable about their base, and therefore the tabs 50 need an area in which to pivot, which is the area created by the apertures 55. To connect the lower ring 40 to the base 35, the indicator 65 on the container 15 is aligned with the corresponding indicator 67 on the base 35. The base 35 is then pushed over the lower ring 40. When the indicators 65, 67 are properly aligned, the tabs 50 pivot into place and abut corresponding lips 60 of the base 35 as best shown in FIG. 3. The base 35 is now secured to the lower ring 40 and in turn the seed container 15. To release the base 35 from the lower ring 40, the operator may rotate the base 35 independently from the container 15. In doing so, the tabs 50, which have a semi-circular upper end 68 abut against an inner sidewall 69 of the base 35, causing them to pivot about their lower end. Continued rotation of the base 35 relative to the container 15 forces the tabs 50 to be positioned against inner peripheral wall 71 of the base 35, at which point the tabs 50 are no longer locked into place and the base 35 can be removed from the container 15.

Figure 4:
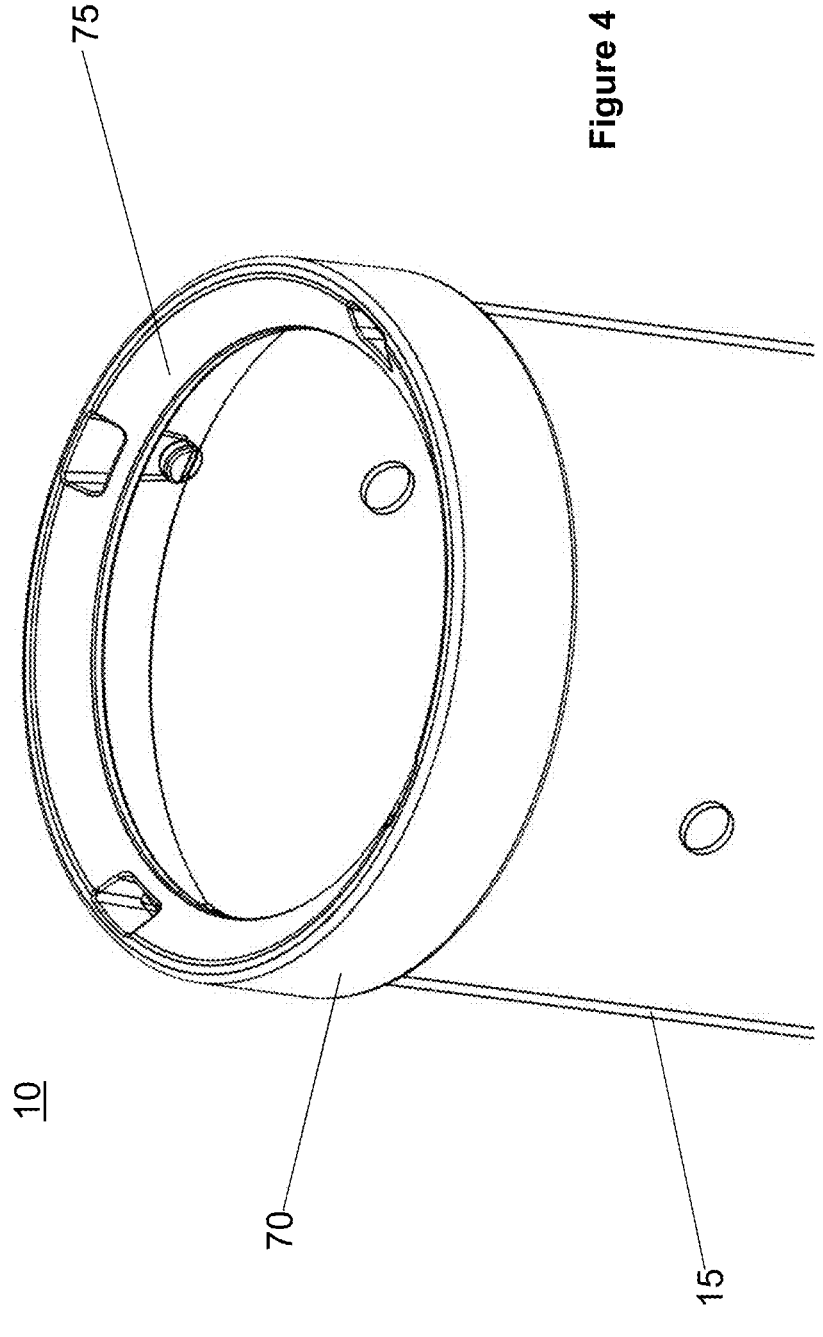
FIG. 4 is a perspective view of an upper ring fitted onto the seed container of the bird feeder of FIG. 1, according to an embodiment of the present disclosure.

With reference to FIG. 4 and according to an embodiment of the present disclosure, the bird feeder 10 is also comprised of an upper ring 70 surrounding the upper portion of the seed container 15. As shown, the upper ring 70 has funnel-shaped inner wall 75. A purpose of the funnel shape of the inner wall 75 is to guide the seeds that are dropped into the bird feeder 10 into the seed container 15. Indeed, providing a slope to the inner wall 75 facilitates seed flow and reduced the loss of seeds that would otherwise fall out of the seed container 15 if not properly deposited therein.

Figure 5:
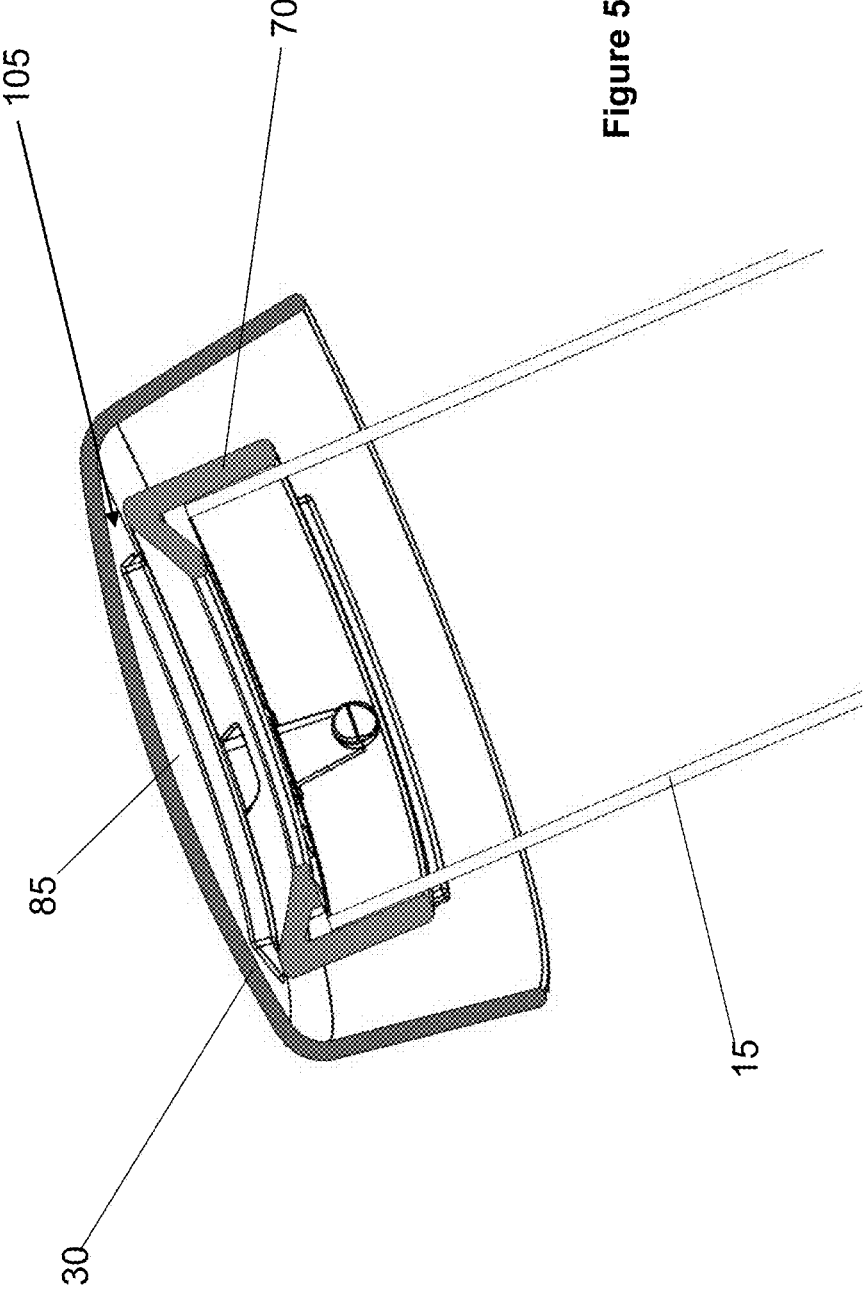
FIG. 5 is a perspective cross-sectional view of the cover resting on the seed container and upper ring of the bird feeder of FIG. 1 and showing an air gap, according to an embodiment of the present disclosure.
Figure 6:
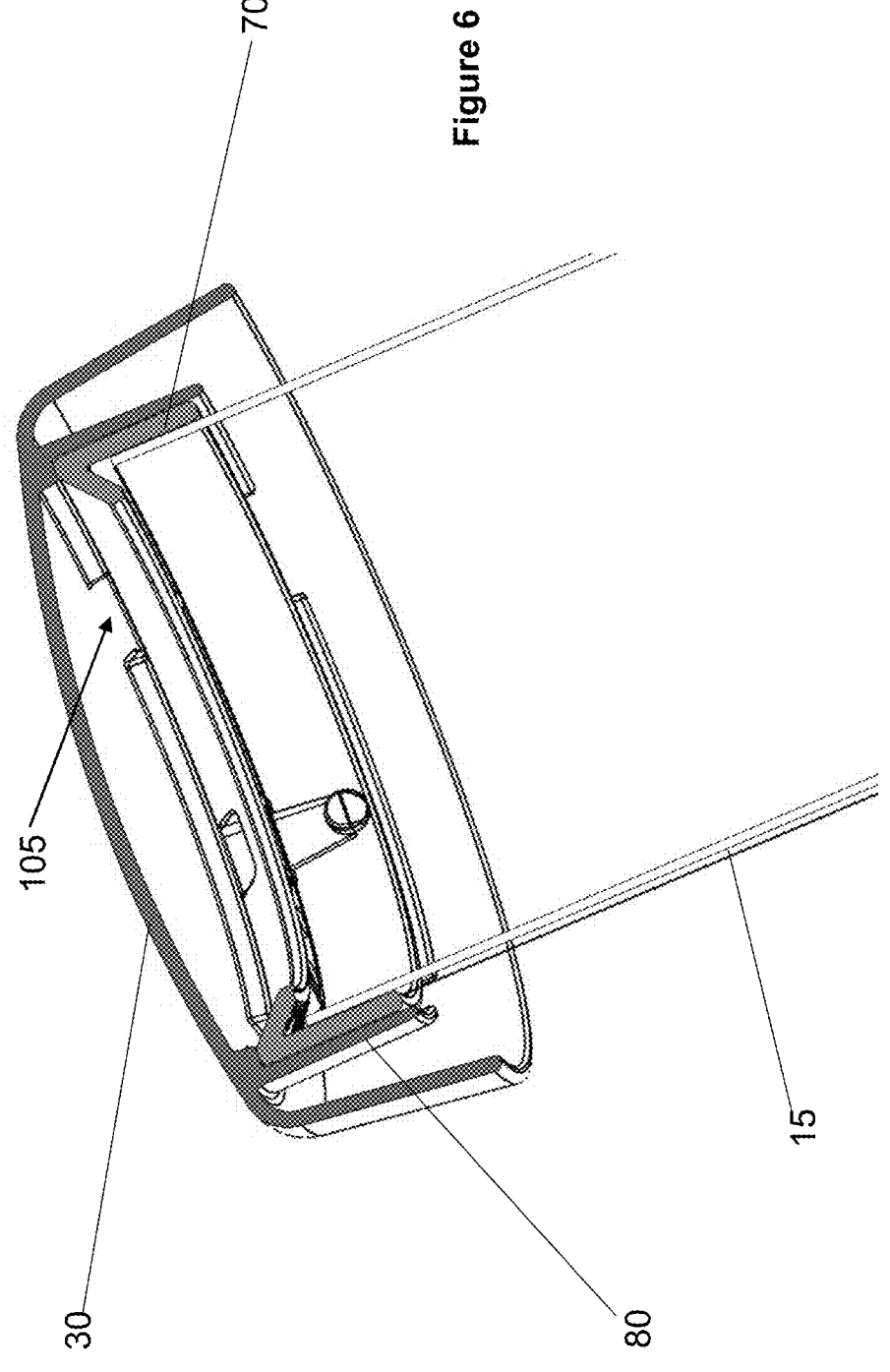
FIG. 6 is another perspective cross-sectional view of the cover resting on the seed container and upper ring of the bird feeder of FIG. 1, according to an embodiment of the present disclosure; and, FIG. 7 is an underside perspective view of the cover of the bird feeder of FIG. 1, according to an embodiment of the present disclosure.
Figure 7:
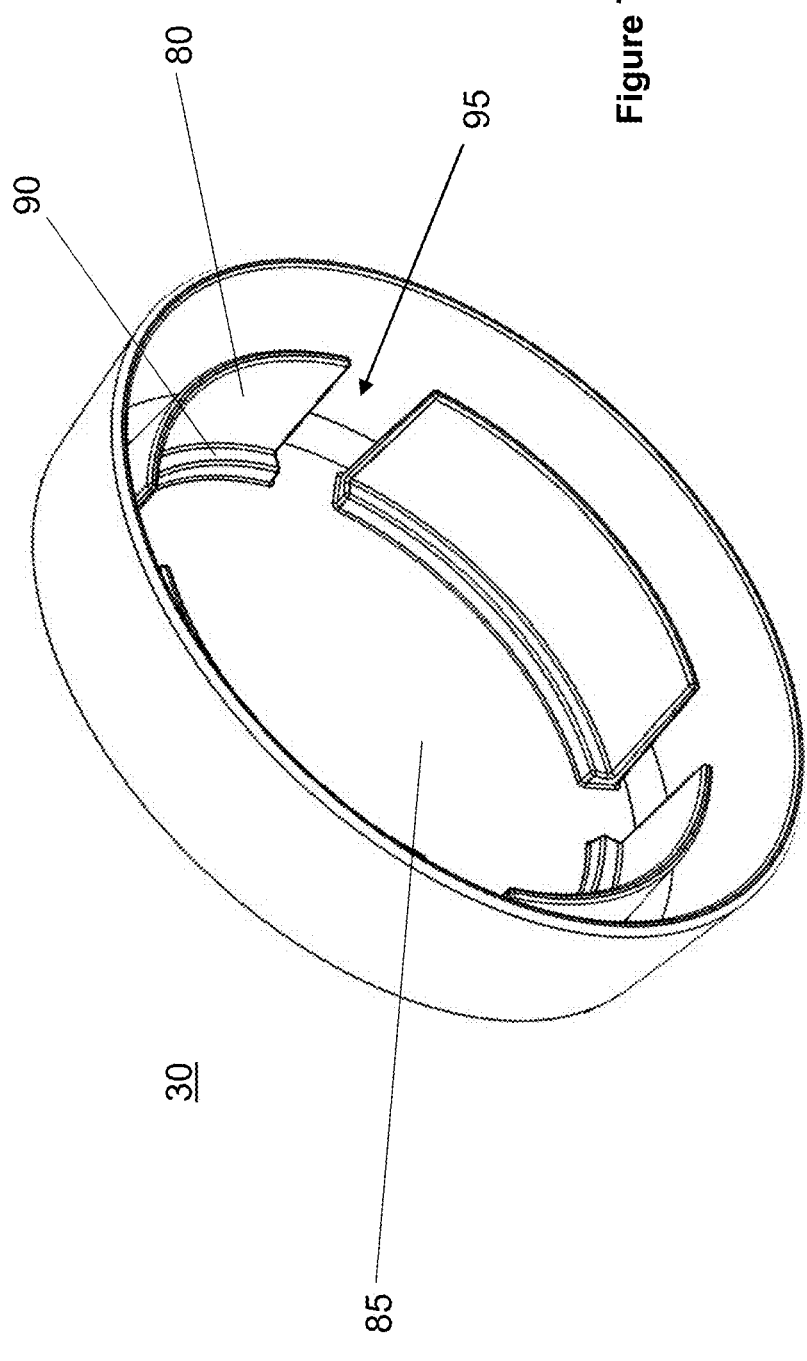

With reference to FIGS. 5, 6 and 7 and according to an embodiment of the present disclosure, the cover 30 is comprised of a plurality of fins 80 extending from an underside 85 of the cover 30. As best shown in FIG. 6, the fins 80 are adapted to receive the upper ring 70 of the seed container 15. Indeed, the upper ring 70 rests on a seat 90 of the fins 80 to seal one to the other. However, each fin 80 is separated one from the other by an opening 95. These openings 95 allow for a gap 105 to form in between the underside 85 of the cover 30 and the upper ring 70 when the cover 30 is positioned onto the upper seed container 15. In turn, the gap 105 allows air circulation and moisture to escape the seed container 15. Such air circulation is advantageous as it helps keeps the seeds fresh and prevents staleness.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A bird feeder comprising:
   a seed container to contain seeds, the seed container having at least one opening to provide access to the seeds;
   a seed tray connected to the seed container and adapted to receive the seeds;
   perches to facilitate access to the at least one opening;
   a lower ring surrounding a lower end of the seed container to reinforce the lower end of the seed container;
   a base releasably secured to the seed container; and,
   a cover;
   wherein the lower ring is comprised of at least one pivotable tab to clip into the base.

2. The bird feeder of claim 1 wherein the base is rotatable relative to the seed container, said rotation of the base to disengage the at least one pivotable tab from the base when the bird feeder is assembled.

3. The bird feeder of claim 2 wherein the at least one pivotable tab is comprised of a circular top end configured to cooperate with an inner sidewall of the base.

4. The bird feeder of claim 1 wherein the seed container is comprised of at least one aperture through which can pivot the at least one pivotable tab.

5. The bird feeder of claim 1 further comprising an upper ring surrounding an upper end of the seed container, the upper ring having a funnel-shape inner wall to reduce seed loss in the bird feeder.

6. The bird feeder of claim 1 wherein the cover is further comprised of a plurality of fins projecting from an underside of the cover.

7. The bird feeder of claim 4 wherein the plurality of fins is separated by openings and configured to receive an upper ring of the seed container.

8. The bird feeder of claim 5 wherein the openings create a gap in between the underside of the cover and the upper ring, the gap allowing air circulation and moisture to escape the seed container.

9. The bird feeder of claim 4 wherein the plurality of fins is further comprised of a seat.

10. The bird feeder of claim 7 wherein the plurality of fins is separated by openings and the seat is configured to receive an upper ring of the seed container.

11. The bird feeder of claim 8 wherein the openings create a gap in between the underside of the cover and the upper ring, the gap allowing air circulation and moisture to escape the seed container.

12. The bird feeder of claim 1 wherein the seed container and the base are each comprised of opposed indicators to identify proper alignment of the base relative to the seed container.

* * * * *